United States Patent [19]

Duvall et al.

[11] Patent Number: 4,793,925

[45] Date of Patent: Dec. 27, 1988

[54] HYDROCYCLONE CONSTRUCTION

[75] Inventors: John F. Duvall, Buffalo, N.Y.; Mike Wilfley, Castlerock; Carl R. MacLachon, Federal Heights, both of Colo.

[73] Assignee: A. R. Wilfley & Sons, Inc., Denver, Colo.

[21] Appl. No.: 877,250

[22] Filed: Jun. 23, 1986

Related U.S. Application Data

[63] Continuation-in-part of Ser. No. 651,781, Sep. 18, 1984, abandoned.

[51] Int. Cl.4 .......... B01D 17/038

[52] U.S. Cl. .......... 210/512.1; 209/144; 209/211

[58] Field of Search .......... 210/512.1; 209/144, 209/211

[56] References Cited

U.S. PATENT DOCUMENTS

| | | | |
|---|---|---|---|
| 4,539,105 | 9/1985 | Metcalf | 209/211 |
| 4,564,443 | 1/1986 | Bliss | 210/512.1 |
| 4,650,584 | 3/1987 | Macierewicz | 209/144 |

*Primary Examiner*—Frank Sever

*Attorney, Agent, or Firm*—John E. Reilly

[57] ABSTRACT

A hydrocyclone device having complementary upper vortex finder and lower cone units each made of hard polyurethane together with a resilient, flexible, replaceable, polyurethane liner having a positive sealing flange associated therewith. The sealing flange of the liner complements with and engages with complementary sealing surfaces on the vortex finder and the lower cone unit when they are joined together by respective threaded portions. Thus, only three elements make up the basic hydrocyclone device with greatly improved resistance to leakage thereof. An outlet opening at the bottom end of the lower cone unit can also be provided with an adjusting unit and a wear insert therewith.

14 Claims, 2 Drawing Sheets

HYDROCYCLONE CONSTRUCTION

RELATED APPLICATION

This application is a continuation-in-part of Ser. No. 651,781, filed 18 Sept., 1984, now abandoned, for HYDROCYCLONE by John F. DuVall et al and assigned to the assignee of the present invention.

This invention relates to hydrocyclones and the construction thereof wherein an internal plastic liner is used with structure associated therewith and with the body of the hydrocyclone for improving the sealing of the device.

BACKGROUND AND FIELD OF THE INVENTION

A common problem with known hydrocyclone devices is that the body thereof, even though made of plastic, is not of the necessary strength, and because of the structural construction tends to leak during operation.

Another problem of known type devices is that many times they are clamped together and thus require fastening structure in addition to the basic members of the hydrocyclone itself. This adds complexity, expense and increases the number of parts which must be provided and/or which can be lost or misplaced.

Another problem with known type devices is that the liner as often used fails to properly mate with the body of the hydrocyclone itself, and thus leaks often occur during operation thereof.

Existing U.S. Letters patents which may be pertinent to this invention are:

| U.S. Pat. No. | Issue Date |
|---|---|
| 2,622,735 | 23 December, 1952 |
| 2,816,658 | 17 December, 1957 |
| 2,995,255 | 8 August, 1961 |
| 3,057,476 | 9 October, 1962 |
| 3,902,601 | 2 September, 1975 |
| 3,988,239 | 26 October, 1976 |
| 4,053,393 | 11 October, 1977 |
| 4,226,707 | 7 October, 1980 |
| 4,234,014 | 18 November, 1980 |
| 4,431,535 | 14 February, 1984 |

U.S. Pat. Nos. 3,902,601 and 4,053,393 are of general interest, in that they do disclose cyclone cones provided with liners, as do the majority of the other patents, but none of them discloses the threaded connection, reinforcement of the sealing structure of the exterior parts of the housing and ability to withstand high pressures and temperatures. None of the known prior art devices offers the new and novel features of the present invention.

SUMMARY OF THE INVENTION

It is therefore an object of the present invention to provide a hydrocyclone device made of plastic material and comprising only two main body parts which are complementarily threaded together in a manner so that as they mate, they can engage with a flange of a liner therebetween, and thus hold the liner in position within the body itself.

Another object of the present invention is to provide an improved hydrocyclone unit having a rigid urethane outer shell which will withstand pressures up to 600 psi before failure.

It is a further object of the present invention to provide an all plastic hydrocyclone unit which is resistant to corrosion and chemical attack, and also has an extremely hard exterior shell which is in the 80 shore "D" range.

It is an additional object of the present invention to provide for a hydrocyclone unit which is of all polymer construction with very hard segments and with a polyether backbone. Such design is extremely strong and also resistant to the elements, chemical breakdown due to hydrolysis, ozone and ultraviolet rays.

Another object of the present invention is to provide a hydrocyclone device which does not require any mechanical fastenings and thus substantially eliminates the numerous parts of the former device.

The present invention is for an improved hydrocyclone device wherein only two body elements are required, each being made of rigid urethane construction and being designed to withstand pressures up to 600 psi before failure thereof. A resilient, replaceable liner having a circumferential flange is preferably used with the device, with the flange being engaged at the joint between the two main body elements for securely holding same within the device. Also, by having only two main body elements, external clamps, fasteners, screws and the like are completely eliminated, thus increasing the simplicity of the device and lowering the cost thereof.

In accordance with the present invention, a hydrocyclone device has been devised and which comprises an upper hollow rigid body provided with a tangential inlet, an inner wall surface, an axially directed outlet and a lower connecting end having a first annular sealing surface thereon, a lower hollow conical body having an upper connecting end provided with a second annular sealing surface thereon, the conical body converging downwardly and terminating in a lower outlet. A resilient, replaceable inner liner is inserted only into the lower conical body, the liner including an inner wall surface forming an uninterrupted continuation of the inner wall surface of the upper body when the device is assembled and having a circumferential flange at its upper end disposed on the second annular sealing surface. Attaching means is provided for attaching first and second annular sealing surfaces of the upper and lower connecting ends and which is defined by an externally threaded projection on one of the bodies and internally threade recess on the other of said bodies complementary to the projection for threadedly interconnecting the upper body and conical body together, the circumferential flange held between the first and second annular sealing surfaces, the attaching means having no extra fastening elements other than said externally threaded projections on one of the bodies and internally threaded recesses on the other of the body for interconnection of the entire device. In this manner, the device is not only capable of maintaining a fixed connection against high pressures encountered in hydrocyclone applications but temperature differences which may occur as a result of the difference in composition between the lower body, its liner and the upper body. Resistance to high pressures encountered may be further aided by the use of a supplementary, outer tongue and groove arrangement in surrounding relation to the complementary projection an recess between the upper body and conical body.

The foregoing together with other objects and advantages which will become subesequently apparent reside in the details of construction and operation as more fully hereinafter described and claimed, reference being had to the accompanying drawings forming a part hereof, wherein like numerals refer to like parts throughout.

DETAILED DESCRIPTION OF THE PREFERRED EMBODIMENT

Figure 1:
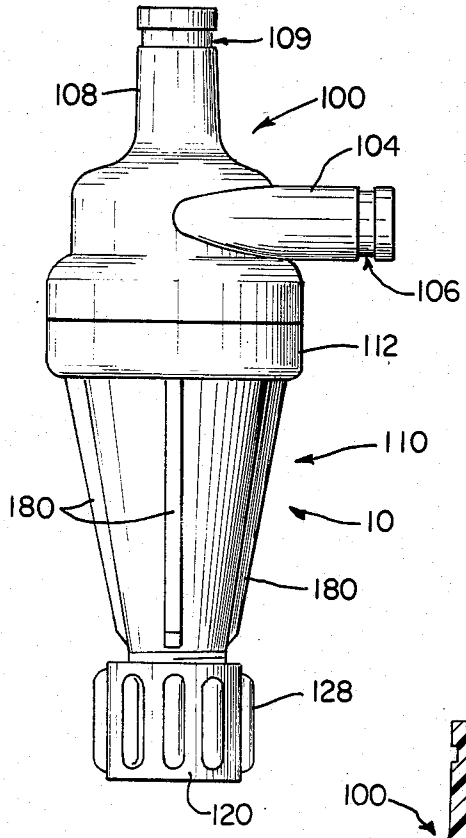
FIG. 1 is a side elevation of the hydrocyclone device of the present invention.
Figure 2:
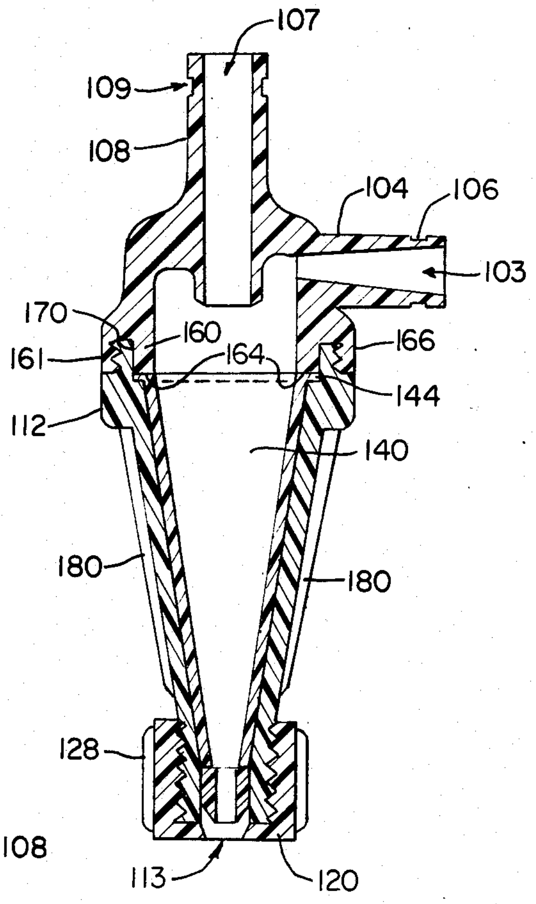
FIG. 2 is a cross-sectional view taken substantially through the center of FIG. 1.

Referring to FIG. 1 of the drawings, reference numeral 10 indicates in general the hydrocyclone device of the present invention. This hydrocyclone preferably uses a hard polyurethane exterior shell with a resilient, replaceable polyurethane liner which incorporates a circumferential flange 164 for providing a positive sealing structure along with the two main body elements where they are joined together by complementary screw threads.

As seen in the drawings, an upper vortex finder 100 has a body 102 having an inlet 104 tangentially to the void area within the finder. The entire finder body is preferably made of hard castable polyurethane. This polyurethane should preferably be in the 70 shore "D" hardness range. An downwardly directed recess 170 is provided at the lower portion of this finder body, the recess being formed between spaced inner and outer concentric annular walls 160 and 161. The outer wall 161 has internal threads 166 designed for complementary mating with the male threads 116 as provided on the lower main body unit 110 of this device. The inner wall 160 terminates in a squared end which defines a seating surface 164.

The vortex finder, i.e., upper body unit as shown, also is provided with a vertical outlet projection 108 having a channel or bore 107 therethrough. Thus, liquid and semi-liquid materials inputted through the tangential inlet 104 with channel 103 therethrough can egress out channel 107 as appropriate. External recesses 106 and 109 on the respective inlet 104 and outlet 108 provide for secure attachment of appropriate coupling hoses thereto.

The lower conical body unit 110 preferably is also cast of polyurethane in the 70 shore "D" hardness range. The body 10 has an upper connecting end 112 of increased thickness defining a reinforced area with an externally threaded, annular male connection 116, which is complementary to the recess 170, projecting upwardly from an annular sealing surface 114 on the connecting end 112. The male connection with threads 116 on the upper portion thereof permits attachment of the lower unit to the vortex finder, and a threaded male connection 118 on the lower end thereof permits attachment of adjusting nut 120 thereto. At least four ribs 180 are provided for structural strength and support, and also for ease in gripping during the unscrewing operation of the lower cone section or body unit 110 from the upper vortex finder 100.

The adjusting nut 120 consists of an internally threaded aperture 126 with an angular seat 127 at its outlet end which compresses a wear insert 150 when tightened. This gives an infinitely adjustable underflow from the assembled hydrocyclone device.

Figure 4:
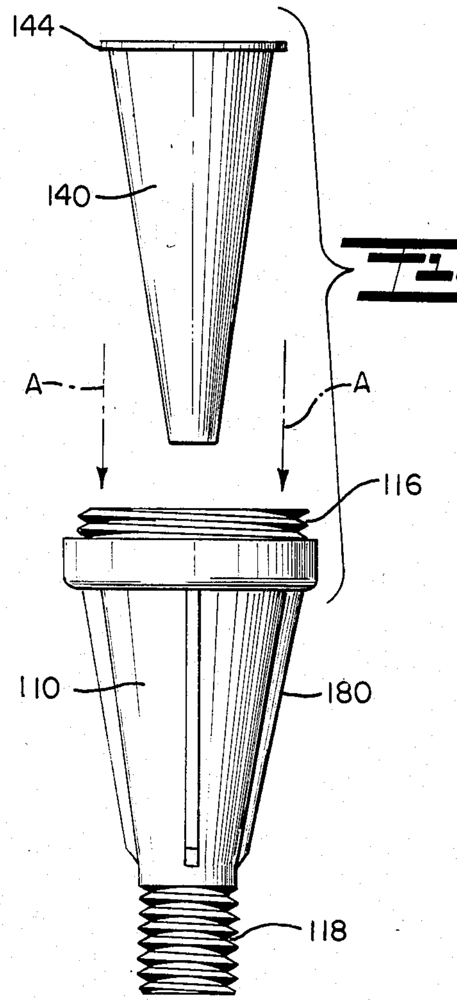
FIG. 4 is an exploded side elevation of the bottom half of the unit together with the removable liner.
Figure 5:
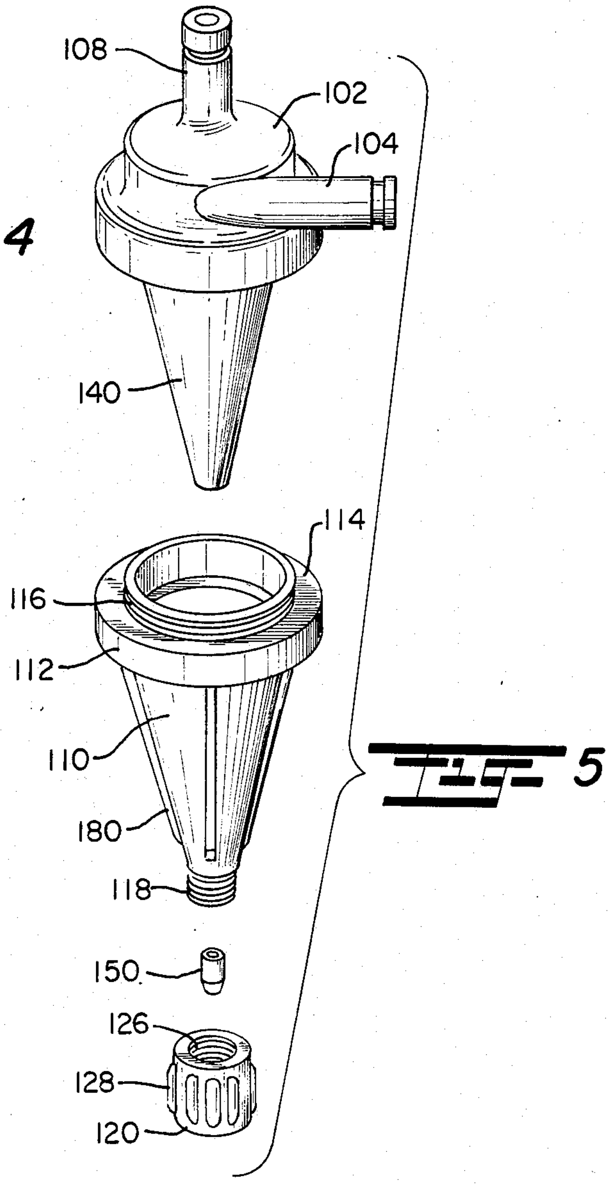
FIG. 5 is an exploded perspective showing the entire hydrocyclone device, with liner and adjustable lower nut and wear insert for the underflow outlet.
Figure 3:
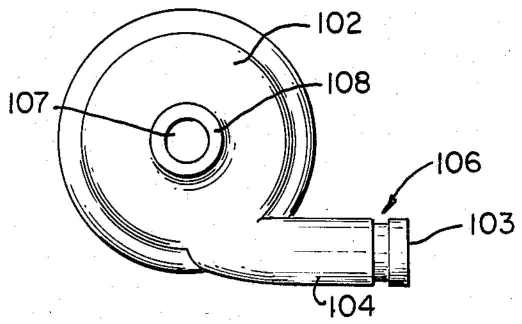
FIG. 3 is a top plan view of the device of FIG. 1.

The liner 140, as best seen in FIGS. 4 and 5, is of conical configuration and is sized for close-fitting insertion into the lower body unit 110, the liner 140 being provided with a circumferential flange 144 at the larger, upper end thereof. This flange 144 mates with and is sandwiched between the sealing surfaces 164 of the respective main body elements when the male connection 116 is threaded into the recess 170.

Thus, as can be readily visualized, after the lower unit 110 with the male threads 116 thereon has the liner inserted thereinto as depicted in FIG. 4 by arrows A, and after assembly of the upper unit thereinto, the liner flange 144 will be securely held between the surface of the lower unit and surface 164 of the vortex finder. By securely tightening these two main body elements together, any possibility of leakage at the joint will be completely eliminated. Thus, the liner functions as both a gasket as well as performing its function as a filter medium.

By suitable adjustment of the lower adjusting nut 120, the wear insert 150 is securely held within the lower end of the lower vortex unit and is secured against the lower end of the liner 140.

As is conventional in hydrocyclone devices, with the input of liquid/solids applied at 104 through channel 103, separated liquids exit out channel 107 of the outlet projection 108, while solids are expelled out the lower opening 113 at the bottom of the device.

Figure 6:
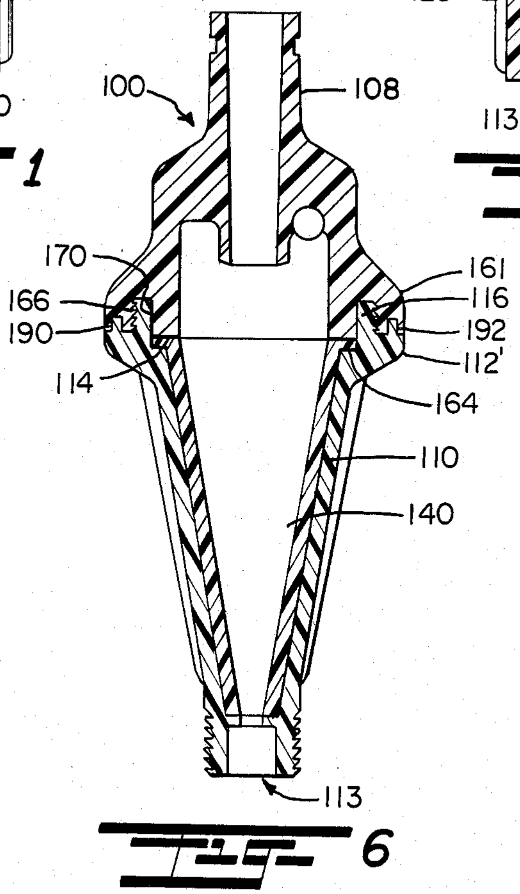
FIG. 6 is a cross-sectional view of a modified form of hydrocyclone device, in accordance with the present invention.

In a modified form to the preferred embodiment, as illustrated in FIG. 6, like parts are correspondingly enumerated to those of the preferred embodiment of FIGS. 1 to 5. The upper body unit or vortex finder 100 and the lower body unit 110 correspond in construction and arrangement of parts to those of the preferred form; thus the upper body unit 100 has a tangential inlet 104, not shown, vertical outlet projection 108, and has a recess 170 at the lower portion with internal threads 166 for threaded connection with the external threading on the male projection 116 of the lower body unit 110. The lower body unit 110 also has an upper connecting end 112', a lower end 113, and a liner 140 has a circumferential flange 144 at its upper end which is interposed between the sealing surfaces 114 and 164 of the body units 100 and 110 when the male connection 116 is threaded into the recess 170. However, in order to further enhance the high prsssure resistance at the interface between the body units 100 and 110, the upper connecting end 112 of the lower body unit 110 and the outer wall 161 of upper body 100 are correspondingly increased in thickness as shown in FIG. 6. An upstanding annular rib or tongue 190 projects upwardly from the upper connecting end 112' at a point intermediately between the male connection 116 and external surface of the end 112. In turn, a complementary annular recess or groove 192 is formed in the upper body intermediately between the recess 170 and external surface of the outer wall 161, the groove 192 disposed in downwardly facing relaiion to and aligned with the rib 190 so as to receive the rib 192 when the vortex finder 100 is threaded onto the lower body unit 110. As shown, the groove 192 is complementary to the rib 190 so that the rib is fully inserted in close-fitting relationship to the groove and to serve as further reinforcement and sealing along the interface between the body units at a point outwardly of the threaded male connection 116. Again, it should be noted that when the lower body unit is made up with the flange on the liner 140 interposed between the sealing surfaces 114 and 164 the inner surface of the liner 140 forms a smooth uninterrupted continuation of the inner surface of the vortex finder 100.

As in the preferred form, the upper and lower body units are composed of polyurethane material in the 70 shore "D" range, but the liner 140 is of a resilient material to effect a positive sealing structure along with the body units when joined together as described. In the modified form the attaching means has no extra fastening elemetts other than the male connection 116 and recess 170 for interconnection of the entire device.

The foregoing is considered as illustrative only of the principles of the invention. Further, since numerous modifications and changes will readily occur to those skilled in the art, it is not desired to limit the invention to the exact construction and operation shown and described and, accordingly, all suitable modifications and equivalents may be resorted to, falling with the scope of the invention.

We claim:

1. A hydrocyclone device comprising: an upper hollow rigid body provided with a tangential inlet, an inner wall surface, an axially directed outlet and a lower connecting end having a first annular sealing surface thereon; a lower hollow conical body having an upper connecting end provided with a second annular sealing surface thereon, said conical body converging downwardly and terminating in a lower outlet, means designed for preventing leakage of fluid between connecting ends of a pair of bodies to be interconnected together including a resilient replaceable inner liner inserted only into said lower conical body, said liner including an inner wall surface forming an uninterrupted continuation of the inner wall surface of said upper body when said device is assembled and having a circumferential flange at its upper end disposed on said second annular sealing surface; and attaching means for attaching said first and second annular sealing surfaces of said upper and lower connecting ends defined by an externally treaded projection on one of said bodies and internally threaded recess on the other of said bodies complementary to said projection for threadedly interconnecting said upper body and said conical body together, said circumferential flange held between said first and second annular sealing surfaces, said attaching means having no extra fastening elements other than said externally threaded projection on said one of said bodies and internally threaded recess on said other of said bodies for interconnection of the entire device.

2. A hydrocyclone device in accordance with claim 1, said liner being composed of a soft, resilient material.

3. A hydrocyclone device in accordance with claim 1, said first and second annular sealing surfaces being located in inner concentric relation to said threaded projection and recess.

4. A hydrocyclone device in accordance with claim 3, said threaded projection and recess extending intermediately between said upper and lower connecting ends of said upper body and said lower conical body.

5. A hydrocyclone device in accordance with claim 1, said upper body and said lower conical body are composed of a rigid polyurethane material capable of withstanding pressures up to 600 psi and having a hardness in the range of 80 shore "D".

6. A hydrocyclone device in accordance with claim 5, said lower conical body having external ribs and a polyether backbone.

7. A hydrocyclone device in accordance with claim 1, said upper connecting end of said conical body having a thickened reinforced portion at the area where it is joined to said finder for the purpose of increasing the overall strength of the device.

8. A hydrocyclone device in accordance with claim 1, said liner eerminating in a lower convergent end, and an infinitely adjustable wear insert member at said lower convergent end of said liner.

9. A hydrocyclone device in accordance with claim 1, including an annular rib projecting from one of said upper and lower connecting ends toward the other of said upper and lower connecting ends and a complementary annular groove in the other of said upper and lower connecting ends, said annular rib and said groove disposed in outer spaced concentric relation to said attaching means, said rib being inserted into said groove when said device is assembled.

10. A hydrocyclone device comprising: an upper body with a lower connecting end having a first annular sealing surface thereon and a lower body having an upper connecting end with a second annular sealing surface thereon, and means for preventing leakage of fluid between said connecting ends of said upper and lower bodies including a resilient replaceable inner liner inserted only into said lower conical body including an inner wall surface forming a continuation of an inner wall surface of said upper body when said device is assembled, said liner including a circumferential flange at its upper end disposed on said second annular sealing surface, and attaching means for attaching said first and second annular sealing surfaces of said upper and lower connecting ends defined by an externally threaded projection and an internally threaded recess on the other of said bodies complementary to said projection for threadedly interconnecting said upper body and said conical body together, said circumferential flange held between said first and second annular sealing surfaces; and an annular rib and a complementary groove disposed in facing relation to one another between said bodies, said rib and said groove disposed in outer spaced concentric relation to said attaching means, said rib being inserted into said groove when said device is assembled.

11. In a hydrocyclone device in accordance with claim 10, said liner being composed of a soft, resilient material.

12. In a hydrocyclone device in accordance with claim 10, said first and second annular sealing surfaces being located in inner concentric relation to said threaded projection and recess, said threaded projection and recess extending intermediately between said upper and lower connecting ends, and said rib projecting from said upper connecting end.

13. In a hydrocyclone device in accordance with claim 10, said upper body and lower conical body units each composed of a rigid polyurethane material capable of withstanding pressures up to 600 psi and having a hardness in the range of 80 shore "D".

14. In a hydrocyclone device in accordance with claim 10, said upper connecting end of said conical body having a thickened reinforced portion at the area where it is joined to said upper body and said rib projecting from said upper connecting end.

* * * * *